SPEECH TRANSMISSION THROUGH TELEPHONE RINGING CIRCUIT
Filed Dec. 29, 1961
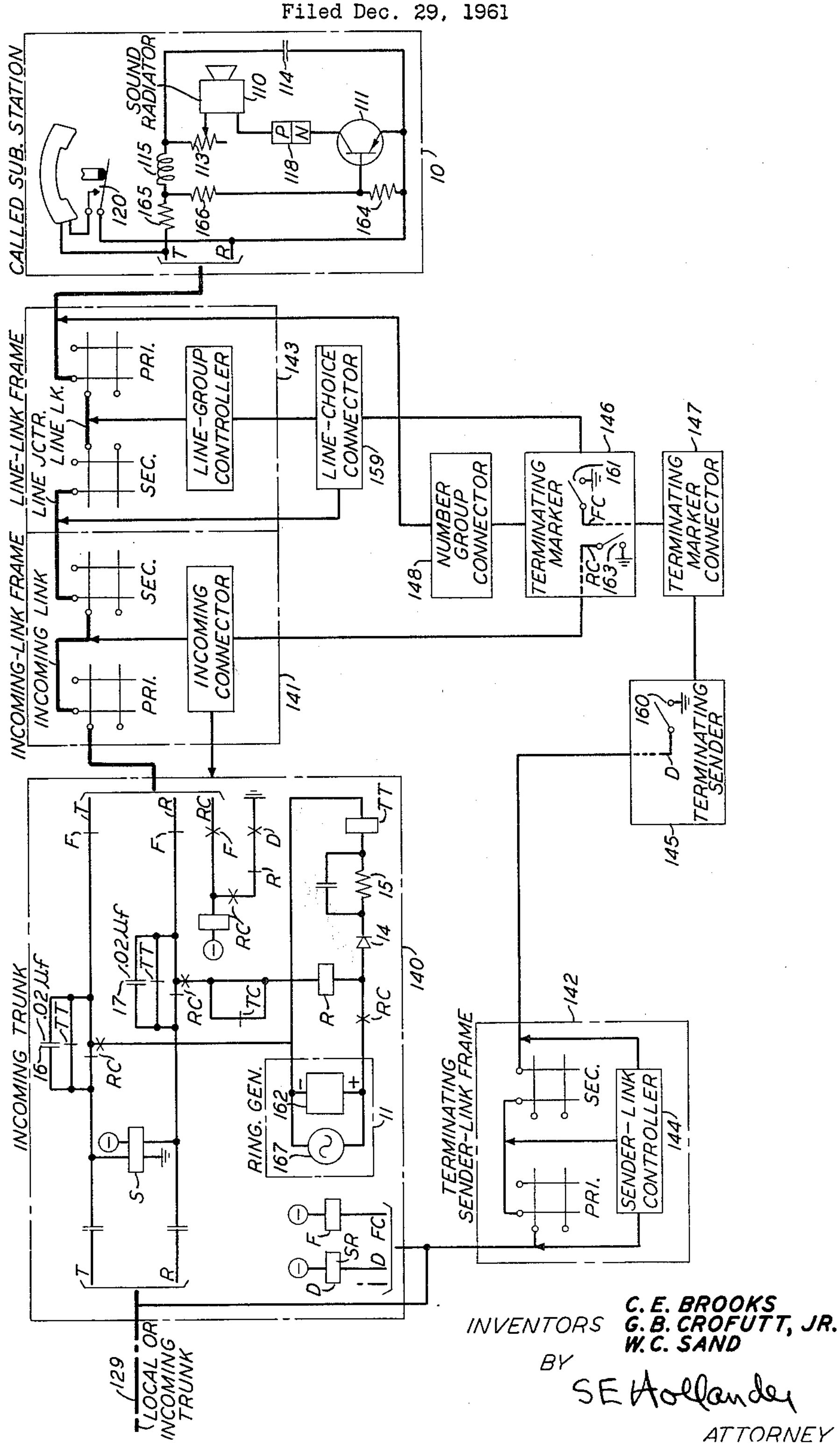
INVENTORS C. E. BROOKS
G. B. CROFUTT, JR.
W. C. SAND
BY SE Hollander
ATTORNEY United States Patent Office 3,165,590
Patented Jan. 12, 1965

3,165,590
SPEECH TRANSMISSION THROUGH TELEPHONE RINGING CIRCUIT

Chester E. Brooks, Montvale, George B. Crofutt, Jr., Verona, and William C. Sand, Chatham, N.J., assignors to Bell Telephone Laboratories, Incorporated, New York, N.Y., a corporation of New York Filed Dec. 29, 1961, Ser. No. 163,186
9 Claims. (Cl. 179—84)

This invention relates to automatic telephone switching systems and more particularly to telephone systems adapted to provide intermittent ringing and speech signals to the called subscriber.

Conventional telephone switching systems have almost universally provided a signaling arrangement to apprise the called subscriber of an attempt to effect a connection to his substation. Ordinarily these arrangements include the use of electromechanical ringers which are operated as a result of signals transmitted by special generating equipment at the central office. Typically, these signals included 20-cycle alternating current either superimposed or not superimposed on direct-current potentials. Simultaneously with the application of ringing signal to the called substation, a corresponding signal (sometimes referred to as "audible ringing"—since the actual 20-cycle ringing signal would be largely inaudible) is transmitted to the calling subscriber indicating the existence of ringing. The latter signal may, for example, be a 420-cycle tone modulated at the same 20-cycle rate as the ringing current.

It has been nearly universal practice to alternate these ringing signals with "silent" intervals which usually are twice the period of duration of the ringing signals.

While this practice has found wide acceptance, it may be observed that the ringing current transmitted to the called substation to actuate the relatively heavy clapper thereat requires considerable power in comparison to the currents transmitted and received during actual conversation. It was the latter disparity that gave rise in certain switching systems of recent development to the use of a "ringer" at the called substation which more closely approximates the current used in speech transmission. In part, this has been necessary as a result of the limitations in current carrying capacity of certain types of crosspoints in the switching network of electronic switching systems. These crosspoints are equipped to carry the usual currents encountered in speech transmission but would be overloaded by the typical currents required for conventional ringing.

In consequence, arrangements have been proposed wherein the conventional electromechanical clapper and bell have been displaced in favor of more efficient electromechanical transducers. These include, for example, the use of horn-type speakers in the base of the called subset and are sometimes referred to as "tone ringers." This designation is apt since the "ringer," actually a sound radiator or horn, operates by the application of a tone, for example 656 cycles, in lieu of the transmission of conventional 20-cycle ringing currents. A tone ringer of this genre is comprehensively described in Patent 2,850,650 of L. A. Meacham, issued September 2, 1958.

The universality of the practice of ringing the called party and awaiting his answer through the lifting of the receiver and closure of the switchhook contacts at the called substation has become so crystallized that the possibility of actually speaking with the called subscriber prior to the lifting of the receiver has escaped consideration in depth. In short, efforts to deliver intelligence information to the called subscriber have not been aggressively sought in view of the classical belief that no such information could (or ought to) be delivered until the called party actually lifted his receiver off hook thereby "tripping" ringing or releasing the ringing equipment at the central office.

A brief inspection of the requirements of certain types of telephone users indicates that it would, in fact, be a considerable advantage to either receive information prior to actually answering by lifting the receiver off hook or to be able to transmit certain information to a party who has not yet lifted his receiver off hook.

A typical situation which presents itself is the case of a surgeon or physician who during office hours is generally required to devote very nearly his full time and attention to the patients in his examining room, office, etc. An incoming call to the surgeon is often initially answered by a receptionist, nurse, or other attendant.

In the event that the surgeon is required for emergency reasons at a hospital or elsewhere, it is apparent that a substantial delay may occur before the receptionist, who may also be occupied, can approach the physical subset, lift the receiver from its cradle, ascertain the necessary information from the calling party, signal the surgeon, await his answer, and apprise him of the called information. Frequently the surgeon may not answer his receptionist's signal immediately in view of his attendance upon a patient.

It would obviously be of decided advantage in the event that an emergency call is made to the surgeon, by a colleague, for example, to provide a direct communication path to the surgeon without the necessity of encountering the above-described circuitous procedure and delay. A very straightforward solution of this problem would be to permit the calling subscriber to actually speak through the called subset even though the receiver remains on its cradle. This technique may be realized by utilizing the same sound radiator which is used for tone ringing to deliver an urgent calling message during the silent interval of ringing.

It is therefore an object of this invention to provide for the transmission of intelligence information to a called subscriber prior to the conventional answering of the called subset.

It is a further object of this invention to transmit intelligence information to a called subscriber during the silent interval of ringing.

Still another object of this invention is to transmit information to a called subscriber through facilities ordinarily employed for other functions.

These and other objects of the invention are achieved in a specific illustrative embodiment in which a telephone substation having a tone ringer including a sound radiator is utilized for voice reproduction as well as conventional tone ringing. For illustrative purposes, the invention will be described in combination with the No. 1 crossbar telephone system as described in Patents 2,089,921 of August 10, 1937, and 2,235,803 of March 18, 1941, of W. W. Carpenter.

In the No. 1 crossbar system the marker makes a conventional called line busy test to ascertain whether the called line is idle. Thereafter the marker extends an incoming trunk circuit from the calling line through an incoming link to a trunk extending to an incoming link frame and line link frame to which latter the called substation is connected.

The incoming trunk applies ringing to the called line and when the called line has answered maintains supervision of the call. At this time a complete channel exists between the calling and called substations. However, there are two vital factors which ordinarily preclude information (speech) transmission at this time. The first is obviously that the called subscriber has not yet answered and therefore his receiver remains disconnected from the line by open switchhook contacts, and the second is that conventional design of ringing arrangements is such that a relatively high impedance to ringing frequencies (and to voice frequencies) is intentionally interposed between the ringing equipment and the calling subscriber. The latter precaution is necessary to prevent the conventional 20-cycle ringing signals from operating supervisory and other relay equipment connected in the channel leading to the calling substation, but incidentally precludes satisfactory speech transmission.

The first handicap has, in the instant invention, been transcended by utilizing the transistor amplifier and sound radiator or tone ringer in the base of the subset described in the above-referred-to patent of L. A. Meacham et al. to transmit voice intelligence during the "silent" interval, i.e., the interval during which no ringing occurs. This is possible since the sound radiator is always connected to the line and is not under the control of the switchhook contacts. The second obstacle is overcome by introducing special equipment described in detail herein at the central office to selectively bypass the high impedance only during the "silent" interval and to permit speech communication over the channel used for ringing.

A feature of this invention is an arrangement for reducing the impedance in the ringing channel during the silent interval of ringing.

An additional feature of this invention includes facilities for delivering speech information to an on-hook substation.

Still another feature of this invention includes facilities for alternately ringing and delivering speech information to an on-hook substation.

A further feature of this invention includes a "talk-through" relay responsive to ringing signals for reducing the impedance in the trunk circuit.

These and other objects and features of the invention may be more readily comprehended from an examination of the following specification, appended claims and attached drawing in which the single figure shows a specific illustrative embodiment of applicants' invention in combination with a No. 1 crossbar telephone switching system.

*General Description of Operation During Terminating Call*

To assist in fixing the perspective of the detailed description which follows, it will be useful at the outset to demonstrate briefly the operation of the combination shown in the drawing during a terminating call. Referring to the drawing, the outline diagram of the No. 1 crossbar equipment utilized during a terminating call to private line substation 10 is shown. It will be noted that the incoming trunk 129 which extends from the calling central office is terminated in incoming trunk circuit 140 which latter includes supervisory and ringing equipment. The incoming trunk circuit appears on the horizontals of the incoming link frame 141 and also on the horizontals of the terminating sender link frame 142. The incoming link frame 141 and the line link frame 143 collectively form the terminating grid network for completing the call through the crossbar office to substation 10.

In accordance with conventional practice described in detail in the above-referred-to Carpenter patents, the sender link controller circuit 144 establishes a path from the incoming trunk circuit 140 to a terminating sender 145 through a crossbar link. The terminating sender 145, when connected to the incoming trunk circuit 140, receives the called line number over the interoffice trunk 129 from the originating office (or over a local trunk if an intraoffice call is in effect). When the complete number has been registered, the terminating sender connects to a terminating marker 146 through terminating marker connector 147.

The terminating sender 145 then transfers the called substation number to the terminating marker 146 which in turn selects an idle path from the incoming trunk circuit 140 to an idle line link horizontal to which substation 10 is connectable. The marker determines on which line link frame the line is located through number group connector 148 and connects to the desired line link frame through line choice connector 159. The originating office sender is released when the record of the called number has been passed to the terminating sender 145. The marker then tests the called line for busy, and, if found idle, establishes a path between the incoming trunk circuit and the called substation 10. Thereafter, the incoming trunk circuit applies ringing current to the called line and when the called line has been answered maintains supervision.

*Combined Speech and Ringing Circuit*

As indicated above, the terminating sender 145 receives the directory digits of the called number. After completing registration, the sender 145 grounds conductor D as shown symbolically by switch 160 to operate relay D.

Also, as indicated above, the sender after completing registration engages marker 146 which applies ground to conductor FC in the conventional manner as shown symbolically by the operation of switch 161; relay F operates in response to this ground.

Operation of relay F causes the operation of relay RC from a ground condition on conductor RC in the marker circuit as shown symbolically by switch 163. Relay RC locks to ground under control of the contacts of relays R and D. After completing its function, the marker 146 opens switch 161 to release relay F. At this time a ringing path may be traced to the called substation. This path is shown from ringing generator 11 over the contacts of relay RC, winding of relay R, contacts of relay RC, contacts of relay F and through the above-described channel including the incoming link frame 141 and line link frame to the ring conductor of substation 10. The path may be further traced from the tip conductor of substation 10, line link frame, incoming link frame, contacts of relay F, contacts of relay RC to the ringing generator 11. "Audible ringing" is delivered to the calling subscriber over condensers 16 and 17 which are designed to attenuate the ringing signal and restrict the frequencies passed to prevent false operation of relay S.

The ringing generator may illustratively be of the type described in the above-referred-to Meacham patent including equipment for generating at least one frequency (e.g., 656 cycles) and the appropriate direct-current bias source 162 for transistor 111 therein referred to. In addition, generator 11 may include conventional 20-cycle ringing equipment for use on conventional substations.

The operation of relay RC, as indicated above, completes a path from the ringing generator 11 to the called substation 10 and in addition opens the trunk circuit in the direction of the calling substation to prevent the ringing signals from falsely operating the supervisory and other relays connected to the trunk. Talk-through relay TT is operated during each ringing cycle over a path which may be traced from the ringing generator, contacts of relay RC, diode 14, resistance 15, winding of relay TT to ground.

Relay TT is designed as a slow-release relay in order to permit the relay to remain operated during those pulses of ringing current which are blocked by diode 14.

During each operation of relay TT, the contacts thereof in parallel with the contacts of relay RC are opened to preclude transmission of a ringing signal to the calling portion of the channel. During the silent interval, however, relay TT releases and the contacts of relay TT in shunt with those of relay RC and capacitors 16 and 17 are closed to permit the transfer of speech information from the calling substation.

*Operation of Sound Radiator at Called Substation*

Referring now to the specific operation of the amplifier connected to the sound radiator 110, it is seen that the amplifier includes a pnp transistor 111. The amplifier shown in the drawing is a portion of the amplifier circuitry described in detail in the above-referred patent of L. A. Meacham and in Patent 2,824,175 of L. A. Meacham and F. West of February 18, 1958. Those portions of the Meacham disclosure which refer to current limiting sections of the tone ringer have been omitted and other necessary modifications to remove the frequency selective features utilized for selective party ringing have also been omitted for clarity of presentation.

The sound level may be adjusted in the sound radiator 110 by potentiometer 113. The sound radiator itself may be of the type disclosed in detail in Patent 2,808,463 of R. T. Jenkins et al. of October 1, 1957.

The alternating-current output circuit for transistor 111 is completed through capacitor 114. Coil 115 acts as a choke coil. The diode 118 in series with the collector of transistor 111 provides "talk-off" protection. In this sense it is used to disable the sound radiator when the substation is off hook and preclude the possibilty of spurious sounds emanating from the radiator in response to speech currents. Diode 118, as explained in detail in the Meacham Patent 2,850,650, is a silicon diode which in its breakdown condition represents a negligible alternating-current impedance. When the substation goes off hook, the line voltage normally on the line is dropped to a value insufficient to maintain breakdown in diode 118. The high impedance in the reverse conducting direction introduced in series with the sound radiator 110 prevents any output from the sound generator.

When the receiver 119 is lifted from its cradle, the switchhook contacts 120 are closed to trip ringing at the central office in the conventional manner by operating trip relay R in view of the higher direct-current flow over the loop thereby releasing relay RC. The sound radiator 110 is then disabled in the manner described above.

However, during the silent intervals, between ringing cycles, transistor 111 is biased in the amplifying region from source 162. As a result voice signals from the calling substation may be traced over a path including trunk 129, and in parallel through capacitors 163 and 164, contacts of relay TT, contacts of relay F, incoming link frame 141, line link frame 143, tip conductor T, resistance 165, resistance 166, base-emitter path of transistor 111, to ring conductor R. Resistance 164 establishes a bias in the conductive condition between the emitter and base of transistor 111.

The amplified output may be traced from the collector of transistor 111, diode 118, sound radiator 110, potentiometer 113, capacitor 114, to the ring conductor R and transistor 111.

Thus the sound radiator 110 performs a dual function. During the ringing interval, the radiator 110 is energized to produce a ringing tone under control of generator 167. During the silent interval, the horn 110 produces amplified speech information transmitted from the calling substation—even though substation 110 remains "on hook" and the switchhook contacts 120 are therefore open.

In the embodiment shown, the parameters of the circuit may illustratively take the following values.

| | |
|---|---|
| Resistance: | |
| **113** | 25,000Ω. |
| **164** | 20Ω. |
| **165** | 2,000Ω. |
| **166** | 1,000Ω. |
| Capacitor **114** | 4 μf. |
| Coil **115** | 12.5 henrys. |

It is understood that the above embodiments are merely exemplary and that various modifications may be made without departing from the spirit and scope of the invention.

What is claimed is:

1. An automatic telephone switching system including a telephone central office, a substation, ringing means at said substation responsive to ringing signals from said office for producing an audible ringing tone, means in said central office effective during a terminating call to said substation for delivering intermittent ringing signals to said ringing means, and means at said central office for controlling the transmission of intelligence information other than said ringing signals through said ringing means during intervals intermediate said ringing signals.

2. An automatic telephone switching system including a telephone central office, a substation, said substation including transmitter-receiving means, switchhook contact means coupling said transmitter-receiver means to said office, ringing means at said substation responsive to signals in the voice frequency range for producing an audible ringing tone, and means at said office effective when said switchhook contacts are in the open condition to transmit speech information through said ringing means when said switchhook contact means are in the open condition during intervals intermediate said ringing signals.

3. An automatic telephone switching system including a telephone central office, a substation remote from said office, ringing means at said substation, signal amplifying means connected to said ringing means, said ringing means being responsive to signals in the voice frequency range, means at said office for delivering ringing signals to said amplifying means to operate said ringing means, and additional means at said office for controlling the transmission of speech information through said amplifying means and ringing means during intervals intermediate said ringing signals.

4. An automatic telephone switching system including a telephone central office, a subscriber substation, ringing means at said substation responsive to signals in the voice frequency range for producing an audible ringing tone, a ringing generator at said central office effective during a terminating call to said substation to transmit a ringing signal to operate said ringing means, and additional means at said central office controlled by said ringing generator for governing the transmission of speech information through said ringing means.

5. An automatic telephone switching system including a telephone central office, a subscriber substation, ringing means at said substation responsive to signals in the voice frequency range for producing audible ringing tone, an amplifier connected in series with said ringing means, ringing generator means at said central office for delivering intermittent ringing signals to operate said amplifier and ringing means, and relay means controlled by said ringing generator means for completing a speech transmission path including said ringing means.

6. An automatic telephone switching system including a telephone central office, a substation, said substation including a speech receiver and transmitter, switchhook contacts for coupling said speech receiver and transmitter to said office, ringing means at said substation responsive to signals in the voice frequency range for producing audible ringing tones, a transistor amplifier connected in series with said ringing means, ringing generator means at said office effective during a terminating call to said substation to operate said transistor amplifier and energize said ringing means to provide an audible ringing tone, and means effective under control of said generator means at said office and during the open condition of said switchhook contacts to transfer speech information through said ringing means.

7. An automatic telephone switching system in accordance with claim 6 wherein said means for transferring speech information includes relay means responsive to the operation of said ringing generator means to complete a first speech transmission channel through said office.

8. An automatic telephone switching system in accordance with claim 7 including in addition means responsive to an off-hook condition at said substation and the closing of said switchhook contacts for disabling said ringing means.

9. An automatic telephone switching system in accordance with claim 8 including in addition means at said central office responsive to the closing of said switchhook contacts for disabling said ringing generator means and for providing a second speech transmission channel through said office.

References Cited in the file of this patent

UNITED STATES PATENTS

| | | |
|---|---|---|
| 1,113,537 | Boze | Oct. 13, 1914 |
| 2,626,384 | Winkler | Jan. 20, 1953 |

| | | |
|---|---|---|
| 2,826,636 | Beatty | Mar. 11, 1958 |
| 2,894,075 | Kunckel | July 7, 1959 |
| 2,951,910 | Bauman | Sept. 6, 1960 |
| 3,026,377 | Sullivan | Mar. 20, 1962 |
| 3,028,452 | Cleary et al. | Apr. 3, 1962 |

OTHER REFERENCES

Automatic Electric Technical Journal, "The New Speakerphone-Executive Model," pp. 232–238, July 1961, vol. 7, No. 7.